Patented Aug. 25, 1942

2,293,805

UNITED STATES PATENT OFFICE 2,293,805

CORK COMPOSITION AND METHOD OF MANUFACTURE

Giles B. Cooke and Michael S. Ebert, Baltimore, Md., assignors to Crown Cork & Seal Company, Inc., Baltimore, Md., a corporation of New York No Drawing. Application February 25, 1939, Serial No. 258,580

10 Claims. (Cl. 260—6)

The present invention relates to improved cork compositions characterized by permanent stability and to processes of manufacturing the same. By "permanent stability," we mean that the cork compositions are substantially or completely free from shrinkage, and, at the same time, possess requisite flexibility and resilience over long periods of time in storage or in use so as to be available as reliable sealing materials.

Cork compositions for many years have been made using glues as binding materials. In order to form a spreadable glutinous binder, as well as to promote softness and resilience in the cork composition, it is customary to include with the glue a solvent plasticizer therefor, usually a polyhydric alcohol which is also effective as a cork softener. This glue solution is readily coatable upon the surfaces of the cork particles, and the binder coated cork upon molding and baking, produces a cork composition having the desired permanent resilience suitable for numerous sealing applications.

After the development of synthetic resins, and due to the advantageous characteristics possessed by such resins for certain uses, the industry substituted adhesive synthetic resins for the conventional glues in making cork compositions. As in the manufacture of glue gels, a resin solvent to enhance the spreading qualities of the adhesive was employed, as well as a softener for the cork in order to overcome the characteristic brittleness of the resin. Since resin technology taught that the usual solvent plasticizers employed with glutinous adhesives, namely, polyhydric alcohols, were equally effective with synthetic resins, it became merely a matter of substituting an appropriate resin for the customary glues in binder solutions for the manufacture of resin bound cork compositions.

In the manufacture of glue gels the dry glue and the polyhydric alcohol glue solvent and cork softener have been customarily heated in a kettle to effect solution or the polyhydric alcohol is added to a liquid or melted glue. Similarly, in the manufacture of a resin gel where the resin is substituted for glue, the polyhydric alcohol resin solvent and cork softener is either added to the resin forming constituents before or during reaction, or after the resin has been reacted to an intermediate stage when it is soluble in the polyhydric alcohol.

The glycols, such as ethylene, diethylene, and triethylene glycol, glycerine, and other polyhydric alcohols, have always been considered 'chemical equivalents as solvent plasticizers and cork softeners in making cork compositions having glue gel binders. Where a synthetic resin binder has been substituted for glue gels in the manufacture of composition cork, this chemical equivalency has likewise been assumed, and it has been suggested that any one of these agents may be used in lieu of the other.

We have discovered that while glue and resin gels are made in substantially the same way and differ only in the distinctive properties of the substituted resin, glycols and glycerine are not chemical equivalents in the manufacture of resin gels for binders for cork composition. That is to say, where glycerine is introduced prior to or during the reaction of a phenol formaldehyde resin, it appears to enter into the reaction and appreciably prolong the curing cycle. Also, the binder exhibits an undesirable odor and taste and evidences deterioration with age. The use of a high boiling glycol, as a substitute for the glycerine, presents the difficulty that such glycols, being toxic, are objectionable in cork compositions for use with foods and medicines.

We have further discovered that propylene glycol constitutes an excellent solvent plasticizer for a synthetic resin and has the important advantage of being non-toxic. Propylene glycol, moreover, does not retard the curing or hardening of the resin, as does glycerine when the latter is present during the initial resin reaction, and is compatible with glycerine. However, this material has too low a boiling point, and, if used alone in amount to constitute both a solvent for the resin and a softener for the cork, it does not permanently accomplish the latter purpose. That is, the cork appears to dry with age and thereby the composition loses its flexibility and softness or resilience.

In the manufacture of cork composition in accordance with the present invention, the resin binder is prepared to have a coatable consistency by including therein a sufficient amount of propylene glycol as will serve as a solvent plasticizer, and this binder is mixed with the cork particles, together with an amount of glycerine sufficient to assure permanent flexibility and resilience of the cork composition. In this manner, by using different polyhydric alcohols, solvent plasticizers and cork softeners, it is possible to satisfactorily substitute resin gel binders for glue gels in making cork compositions, and the product has a long life and a wide utility, including particular value for the sealing of products, such as foods and medicines.

We have, moreover, observed that where glycols or glycerine are employed in connection with synthetic resin binders for comminuted cork as a substitute for glue gels, that the cork composition undergoes shrinkage, notwithstanding that the alcohols employed have a high boiling point. This shrinkage factor is not vital in the case of cushion liners for closure caps where a shrinkage of ½ of 1% would not be noticed, but, in the case of a twenty-six inch gasket, for example, such shrinkage might destroy the value of the gasket for sealing purposes.

To overcome this shrinkage, which is characteristic of glue and resin bonded cork compositions using polyhydric alcohols, adhesive solvents and cork softeners, we have developed a cork composition having a resin binder in which shrinkage is practically eliminated. This binder is made by reacting with the resin forming constituents an appropriate amount of a suitable protein. The resin, when cured in the final cork composition is characterized by freedom from movement, i. e. expansion and contraction, and imparts permanent flexibility to the cork composition. By controlling the amount of protein relative to the amount of phenol, the binder may have imparted to it any desired flexibility and elasticity. Moreover, the binder by controlling the relative amount of protein employed can be formed to possess a wide range of degrees of compression and rebound. The binder is prepared by the process previously described, any suitable glycol, preferably a high boiling glycol unless toxicity will be objectionable, being incorporated with the resin-forming constituents before or during reaction, and the resin being formed into a solution by the subsequent addition of glycol. The cork composition is formed by mixing the binder, cork and glycerine or glycol in the same manner as above referred to and molding and baking.

In carrying out the present invention, phenol and formaldehyde, the latter in aqueous solution, or any suitable methylene or methylene liberating compound, are reacted in a jacketed kettle in the presence of a small amount of propylene glycol and an alkaline catalyst, such as sodium hydroxide. It is a critical step that the reaction mass is first boiled at about 180° F. or until substantially all the water has been evaporated. When the water has been substantially entirely removed, the reaction has not proceeded very far, and heating is continued at an elevated temperature, e. g., between substantially 195° F. and 200° F. until the viscosity reaches a desired point as indicated by tests with a viscosimeter, the viscosity rising rapidly under the increased temperature. At this point, there is added a substantially larger proportion of propylene glycol which serves to cool the partially condensed liquid reaction product and aids in checking the reaction. The reaction is positively checked by turning off the steam for heating the reaction vessel and running cold water in the heating jacket. The propylene glycol does not enter into the reaction, and, as above explained, is harmless as far as toxicity is concerned. Moreover, the propylene glycol does not impart odor or taste, and is an excellent resin solvent. The binder solution contains the resin in an intermediate stage, and includes propylene glycol in amount to produce a spreadable coating, but not in an effective amount to give a permanently soft, resilient cork composition. At this point, the spreadable resin solution is added to a mass of the cork granules in an amount to predominate by volume. The cork is uniformly mixed and coated with the solution. There is now added to the binder-coated cork, a resin hardening agent, and the desired cork softener, namely, glycerine. The hardener is preferably sodium hydroxide in aqueous solution, and the glycerine is in amount to provide a cork composition which is permanently flexible and resilient.

When a molding operation is carried out on the cork composition, for example, to form cork rods, it is preferable also to introduce a suitable amount of wax to lubricate the rod and enable it to be readily removed from the form.

The cork composition is subjected to heat and pressure for sufficient length of time to harden the resin and provide a firm strong binder. In this binder, the glycerine is present in amount to soften the cork and maintain this condition permanent for a relatively long time period. The glycol does not have this property of retaining the cork soft, and, consequently, it is used only in amount sufficient to effect the proper distribution of the resin upon the cork particles. That is to say, the glycol has some softening effect upon the product, but, in the present composition, this is not its primary function, since we have discovered that the glycol dries out rapidly unless a high boiling expensive type is employed which cannot be used where food products or medicines are to be sealed in view of its toxic qualities.

In the case where a protein is used in making the resin, the same is incorporated in the phenol, and the process of forming the resin-glycol solution and the glycerine softened resin bound cork composition, is generally similar to that above described. The phenol-aldehyde-protein resin in solution in glycol when cured is distinguished from the usual phenol aldehyde condensation products, in that the resin is non-shrinking, and possesses permanent flexibility, elasticity and any required coefficient of compression and rebound, depending upon the relative proportions of protein to phenol in the resin. The cork composition employing this resin as a binder and glycerine as the cork softener, is free of shrinkage, and maintains its size and shape. It is possible with this phenolic-protein type of binder to use high boiling, toxic glycols as both solvent plasticizer and cork softener for the cork composition, except where toxicity is objectionable.

*Example I*

The following method of procedure is used to prepare a cork composition in the form of rods from which cushion liners for caps may be severed: 31 lbs. of aqueous formaldehyde (40%) and 20 lbs. of phenol are placed in a suitable kettle, together with 10 lbs. of propylene glycol and a ¼ lb. of sodium hydroxide dissolved in a pound of water. The mixture is heated at about 180° F. in a suitable steam jacketed kettle for about an hour. When the water has been substantially entirely removed, the temperature is elevated to 195 to 200° F. and the mixture heated until the viscosity approaches that required for the particular particle size of the cork to be treated. This heating step consumed approximately 30 minutes. Thereafter, there is added the remainder of the propylene glycol (about 20 to 25 lbs.) to provide a solution suitable for coating the cork granules. The addition of the glycol at this point serves to cool the partially condensed product and check the reaction, thereby cooperating with the positive cooling step of turning off the steam in the kettle and running in cold water in the heating jacket thereof.

The propylene glycol does not enter into the reaction and forms an excellent non-toxic resin solvent, so that the resin solution is readily coatable upon the cork granules.

While we prefer to add the propylene glycol in two stages, as above explained, it may all be added at the time of the initial reaction, and it is to be understood that the coatable propylene glycol solution of resin contains the resin in an intermediate stage of reaction.

Notwithstanding that there is approximately 30 to 35 lbs. of propylene glycol present, this is not an amount effective to give a permanently resilient cork composition, and, as explained above, the low boiling point of propylene glycol does not enable it to maintain the cork composition soft and resilient under normal conditions of storage, shipment and use for more than a limited period of time.

The resin solution as a fluid body now has added to it cork granules or particles in an amount to predominate by volume, e. g. 4 lbs. of granulated cork to 1 lb. of the resin solution. The cork is uniformly mixed with the solution whereby the binder is evenly distributed over the surfaces of the cork particles.

To the mass thus produced, there is added a mixture of any suitable resin hardening agent and the cork softener, e. g. an aqueous solution containing 80% glycerine, 5% sodium hydroxide and the rest water. A half pound of this solution will be sufficient.

The sodium hydroxide solution or other hardener and the glycerine may be added independently, but the procedure of adding the same together is frequently convenient. The mixture is thoroughly incorporated into the coated cork and the same is ready to be molded. In this connection, the hardening agent and glycerine may be added to the resin solution, and then the cork added to the mixture instead of adding the cork to the resin solution, and thereafter incorporating the hardening-glycerine solution. This latter procedure enables less glycol to be used, in that the glycerine acts as a solvent plasticizer to impart required spreading qualities to the binder.

The cork composition is placed in the usual tube molds and baked to cure the resin to the insoluble state, and for this purpose there is preferably included in the cork composition a sufficient amount of wax as will preclude the rod sticking to the mold.

As stated above, all of the glycol may be added to the resin-forming members before or during the resin reaction, but we prefer, and it is critical from the standpoint of commercial production, to add the glycol initially in a small amount, and after the resin has reached the intermediate stage to add the final amount of solvent. The preferred procedure is advantageous, because the reaction moves faster in the presence of the smaller amount of glycol, in that the water is more quickly eliminated.

It is to be noted that while the total amount of glycol is insufficient to produce a permanently soft and resilient cork composition, the glycerine overcomes this deficiency.

It is, of course, to be understood that the glycol present aids in maintaining the cork soft, but it is not in amount to promote permanent cork softening, which function is the primary purpose of the glycerine. In this connection, notwithstanding that the glycol evaporates, the flexibility and cork softness are not substantially affected, due to the presence of the glycerine. This is true, even though all of the glycol may evaporate, which, of course, does not occur since the glycerine apparently serves to retard the rate of the evaporation of the glycol.

The cork composition, in which propylene glycol is used as the solvent plasticizer for the resin and glycerine is employed as the cork softener, is particularly valuable in connection with the sealing of products such as foods and medicines, but may be used under numerous other sealing conditions.

The use of an alkaline catalyst is preferred, and as mentioned above, any suitable catalyst instead of sodium hydroxide may be used.

Where any of the glycols are used as the solvent plasticizer for the resin, including propylene glycol, it is desirable to counteract shrinkage, which, as explained above, is a common objection with glue-bonded, as well as resin-bonded cork compositions, including a polyhydric alcohol. In the case of resin bonded cork compositions, we believe that the shrinkage is due to the fact that the resin condensation reaction becomes extremely slow as it nears the end point, and, therefore, as composition cork containing the resin is aged, slow polymerization goes on with incident shrinkage until the reaction is completed. This shrinkage is particularly undesirable with relatively large gaskets, in that it sometimes is greater than the critical tolerance permitted.

We have discovered that this shrinkage can be successfully counteracted where a glycol is used as the solvent plasticizer for the resin, as well as a softener for the cork, and also where glycerine is used as a softener for the cork as herein described, by preparing a binder in accordance with the example now to be described.

*Example II*

In the making of the non-shrinking type of binder, the proportions and procedure are similar to that just above described, except that a protein is added to the phenol and any appropriate glycol may be used unless the matter of toxicity is important, when propylene glycol will be employed. The protein, such as milk casein or soy bean casein, 10 pounds, or zein from corn, 18 pounds, is dissolved in the melted phenol, and then the resin reaction is carried forward as described. When the desired viscosity of the resin has been obtained, the mass is cooled by addition of a further amount of glycol, and the reaction is checked all as above described. The resultant glycol solution is clear and transparent, showing that a chemical union is formed by the phenol, formaldehyde and protein. When carried to the final setting by heat, the resin is free from movement, and is insoluble in water, alcohol and organic solvents, and is resistant to acids and alkalies as is true with the resin of Example I. Moreover, the binder of the present example remains tough, flexible and elastic, in addition to possessing great strength. An outstanding characteristic is the variable coefficient of compression and rebound which may be imparted to the resin binder by controlling the percentage of protein to phenol, i. e. the greater the amount of protein, the higher the coefficient of compression and rebound, and elasticity. In the present example, the binder when cured has a high coefficient of compression and rebound, and is flexible in that it is rubbery or elastic. The binder solution is mixed with comminuted cork, as previously described, there being present in the solution a sufficient amount of the (high boiling) glycol to act both as a cork softener and solvent plasticizer for the resin or a required amount is added, and if propylene glycol or some other low boiling glycol or a high boiling glycol in amount to constitute a solvent plasticizer is used, a suitable amount of glycerine is added to the binder coated cork to assure permanent cork softness and resilience. The use of the binder of Example II counteracts the frequently encountered objectionable shrinkage, and, at the same time, imparts the valuable properties of the resin adhesive above described to the cork composition.

The proportions set forth in the preceding examples may vary widely but within critical limits in order to prepare the many different grades of composition cork.

Thus, in the case of Example I, the proportions may be varied as follows:

| | |
|---|---|
| Aqueous formaldehyde | lbs 30 to 36 |
| Phenol | lbs 20 |
| Propylene glycol | lbs 2 to 15 |
| Sodium hydroxide | oz 2 to 5 |
| Water | lbs 1 |

After the water has been removed and the resin formation has proceeded to give the desired viscosity, from 10 to 30 lbs. of propylene glycol are added.

In preparing the composition cork, the following range of proportions may be followed:

| | |
|---|---|
| Resin | lb 1 |
| Cork | lbs 2½ to 5 |
| Glycerine-water-sodium hydroxide solution | oz 5 to 12 |

In the case of Example II, the resin may be prepared by varying the proportions as follows:

| | |
|---|---|
| Aqueous formaldehyde | lbs 30 to 36 |
| Phenol | lbs 20 |
| Protein | lbs 5 to 25 |
| Propylene glycol | lbs 2 to 15 |
| Sodium hydroxide | oz 2 to 5 |
| Water | lb 1 |

After the water has been removed and the resin formation has proceeded to give the desired viscosity, from 10 to 30 lbs. of propylene glycol are added.

In the preparation of the composition cork, the following variation in proportions is utilized:

| | |
|---|---|
| Resin | lb 1 |
| Cork | lbs 2½ to 5 |
| Glycerine-water-sodium hydroxide solution | oz 5 to 12 |

We claim:

1. Binder coated comminuted cork comprising cork particles having a binder coated thereon, said binder being a resinous compound in an intermediate stage of phenol and formaldehyde reacted in the presence of propylene glycol.

2. Binder coated comminuted cork comprising cork particles having a binder coated thereon, said binder being a resinous compound in an intermediate stage of phenol and formaldehyde reacted in the presence of propylene glycol and including glycerine in amount effective to render the cork particles substantially permanently soft and resilient.

3. Binder coated comminuted cork comprising cork particles having a binder coated thereon, said binder being a resinous compound in an intermediate stage of phenol and formaldehyde and protein reacted in the presence of propylene glycol.

4. Binder coated comminuted cork comprising cork particles having a binder coated thereon, said binder being a resinous compound in an intermediate stage of phenol and formaldehyde and protein reacted in the presence of propylene glycol and including glycerine in amount effective to render the cork particles substantially permanently soft and resilient.

5. Cork composition comprising comminuted cork in amount to predominate by volume united by a binder which is a resinous compound in insoluble and infusible state of phenol and formaldehyde reacted in the presence of propylene glycol.

6. Cork composition comprising comminuted cork in amount to predominate by volume united by a binder which is a resinous compound in insoluble and infusible state of phenol and formaldehyde reacted in the presence of propylene glycol and including glycerine in amount effective to render the cork particles substantially permanently soft and resilient.

7. Cork composition comprising comminuted cork in amount to predominate by volume united by a binder which is a resinous compound in insoluble and infusible state of phenol and formaldehyde and protein reacted in the presence of propylene glycol.

8. Cork composition comprising comminuted cork in amount to predominate by volume united by a binder which is a resinous compound in insoluble and infusible state of phenol and formaldehyde and protein reacted in the presence of propylene glycol and including glycerine in amount effective to render the cork particles substantially permanently soft and resilient.

9. The method of making a cork composition which comprises coating the cork granules with a spreadable binder which is a resinous product in an intermediate stage of phenol and formaldehyde reacted in the presence of propylene glycol, and baking the binder coated cork to render the resin infusible and insoluble and bind the cork granules together.

10. The method of making a cork composition which comprises coating the cork granules with a spreadable binder which is a resinous product in an intermediate stage of phenol and formaldehyde and protein reacted in the presence of propylene glycol, and baking the binder coated cork to render the resin infusible and insoluble and bind the cork granules together.

GILES B. COOKE.
MICHAEL S. EBERT.